J. C. BARKER.
PNEUMATIC TIRE.
APPLICATION FILED NOV. 13, 1916.
1,244,447.
Patented Oct. 23, 1917.
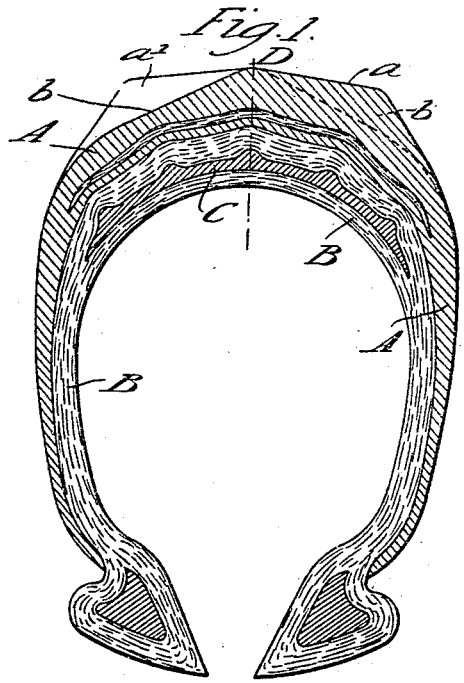
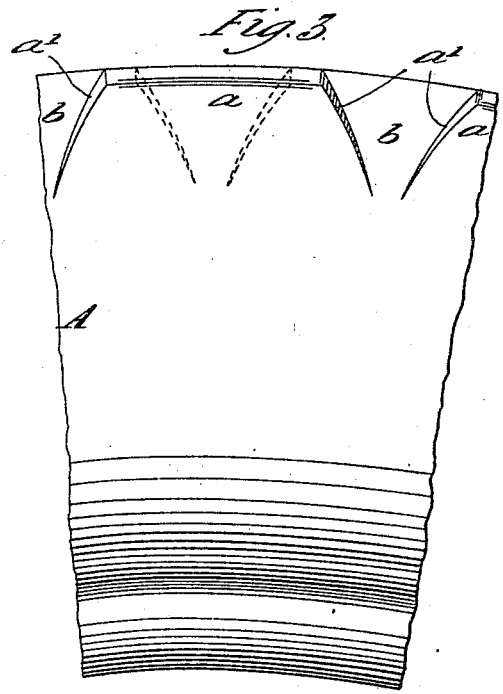
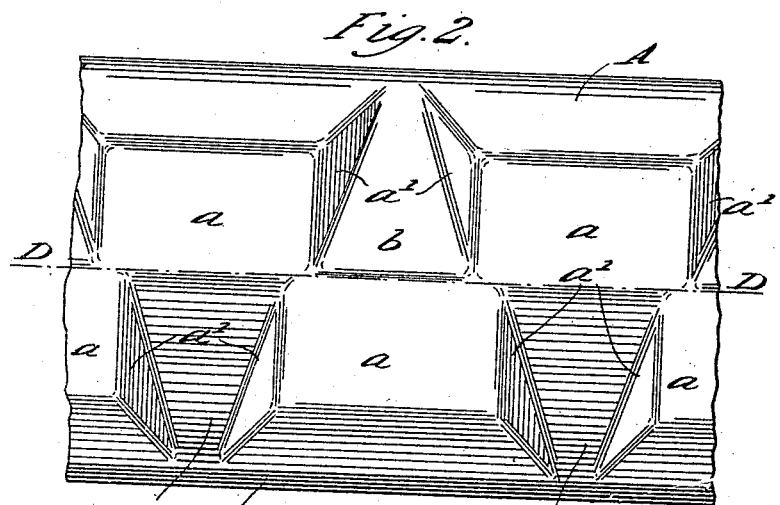
Witnesses:
M. E. McHale
C. D. Kasler
Inventor
John C. Barker
by James L. Norris
Attorney

UNITED STATES PATENT OFFICE.

JOHN CHARLES BARKER, OF LONDON, ENGLAND.

PNEUMATIC TIRE.

1,244,447.  Specification of Letters Patent.  Patented Oct. 23, 1917.

Application filed November 13, 1916. Serial No. 131,126.

*To all whom it may concern:*

Be it known that I, JOHN CHARLES BARKER, a subject of the King of Great Britain, residing in London, England, have invented certain new and useful Improvements in Pneumatic Tires, of which the following is a specification.

This invention relates to the outer covers of pneumatic tires for the wheels of vehicles of the kind wherein the tread of the tire is provided with a number of integrally formed four sided truncated pyramidal projections arranged in parallel circumferential rows around the crown of the outer cover on either side of the central plane of the tire and in such a manner that those in one row are staggered with respect to those in an adjacent row, the inner sides of the projections being extended to the respectively opposite lateral portions of the cover. It consists in improvements having for their object to promote a better grip by the tire of a road surface, to localize the gripping to the parts of the tire where greater strength resides and there is least strain, and to strengthen the projections themselves, thereby minimizing the risk of the projections being severed from the body of the cover.

Heretofore in tires of the above-mentioned type, either the projections have been disposed so that they merge into a continuous unbroken projecting strip along the crown of the tread, or the projections constituting a row have been separate from and independent of one another and also of the projections in a parallel row, a recess or space or spaces being left in the neighborhood of the central plane of the tire between the rows of projections, an arrangement which tends to render steering more difficult and leaves those sides of the projections next to and parallel with the central plane of the tire unsupported.

According to this invention, there is neither a continuous projecting strip along the crown nor is any space left between the rows of projections, but the inner edges of the tread surface of all the projections are all made to terminate in the said central plane, and the projections in one row are arranged to overlap and merge into those of another row, the length of the tread surface of each projection, measured circumferentially in the direction of the line of travel being greater than the correspondingly measured length between the adjacent side edges of the tread surfaces of any two neighboring projections of a row.

The invention will be described with reference to the accompanying drawing, in which Figure 1 is a cross section through a tire having the improvements applied; Fig. 2 is a plan view of a portion of the tire tread showing two rows of integral projections, and Fig. 3 is a side view of a portion of the tire represented in Fig. 1.

In the drawing, A denotes the outer cover of a tire which is provided with an inextensible lining B, adapted to embrace the usual air tube which is not shown, and with a cushion piece C interposed between the lining B and under surface or backing of the tread portion of the outer cover A, the three members A, B and C being securely connected together by vulcanizing or in other suitable ways. Two rows of projections $a$ are formed on the outer cover, one of said rows on each side of the center D of the tread portion of the cover. These projections $a$ have substantially rectangular tread surfaces, and, as shown in Fig. 2, the projections $a$ on one side of the center D of the tread portion of the cover are in staggered relation to those on the opposite side of said center. The former projections have their inner sides or edges substantially in alinement with the corresponding sides or edges of the latter projections and with the center D of the tread portion of the cover. The ends of each of the projections $a$ of the row on one side of the center D of the tread portion of the cover also overlap the ends of a pair of projections $a$ of the row on the opposite side of said center. As clearly shown in Figs. 2 and 3, the sides $a'$ of the projections $a$ which extend transversely with reference to the tread portion of the cover taper in a manner to cause the bases of the projections to be larger than their tread faces with the consequence that each of the spaces $b$ intervening between two projections of a row taper outwardly from the central plane, that is to say, the length of the space measured along circumferential lines parallel to the central plane becomes shorter the farther such lines are away from the central plane. In this way the projections comprise great strength for all their sides taper, so that the length and breadth of a projection is greater at its base than at its tread surface. The narrowest part of a space between two adjacent projections of either row is between the outer extremities of the bases of the projections, that is to say, where the tread portion merges into a side of the cover and where the tire has greater strength and is subject to least strains. The tread surfaces of the projections *a* are preferably flat as shown in Fig. 1.

By attaching to the inner or outer surface of the outer cover the inextensible lining B and interposed between this lining and the tread portion A the cushion piece C (which may be a layer of soft rubber or equivalent material), strain is taken off the tread portion and any pressure transmitted by the inner tube absorbed. In this way the tread portion of the tire is not subject to any pressure from the inflated air tube and can perform a gripping action on a road surface with its natural resiliency. The soft rubber layer may cover only what corresponds to the tread portion of the lining and need not extend down the side walls thereof. This layer also serves to protect effectively the lining B from injury through water soaking through a damaged part on the outer face of the tire.

As a further precaution against creeping of the cushion piece C and the forming of rucks on the under surface or backing E of the tread portion A, the outer surface of the piece C may be made slightly undulating in cross section to constitute ribs or be provided with projections, as shown, so that on the projections being pressed into the backing a firm grip between the two parts is obtained.

Having thus described the nature of the said invention and the best means I know of carrying the same into practical effect, I claim:—

1. An outer cover for a pneumatic wheel-tire provided with a multiplicity of integrally formed four-sided truncated pyramidal projections, arranged in two longitudinal rows around the tread portion of the cover and in staggered relation, the projections in each row being spaced apart and having tread surfaces of rectangular configuration, the inner longitudinal edges of said surfaces each lying in the central plane of the wheel and having a length, measured circumferentially in the direction of the line of travel, greater than the correspondingly measured length between adjacent transverse edges of the tread surfaces of any two neghboring projections of a row.

2. An outer cover for a pneumatic wheel-tire provided with a multiplicity of integrally formed four-sided truncated pyramidal projections, arranged in two longitudinal rows around the tread portion of the cover and in staggered relation, the projections in each row being spaced apart and having tread surfaces of rectangular configuration, the inner longitudinal edges of said surfaces each lying in the central plane of the wheel and of such a length measured circumferentially in the direction of the line of travel that the inner longitudinal edge of each of the tread surfaces of either row of projections overlap the inner longitudinal edges of the tread surfaces of two adjacent projections of the other row.

In testimony whereof I have signed my name to this specification in the presence of two subscribing witnesses.

JOHN CHARLES BARKER.

Witnesses:
W. J. SKERTEN,
JOSEPH MILLARD.